Oct. 22, 1968    J. H. BURKHART    3,406,649
METHOD AND APPARATUS FOR DRYDOCKING A BOAT HULL OR OTHER
FLOATING STRUCTURE IN A BODY OF WATER
Filed Nov. 25, 1966    3 Sheets-Sheet 1
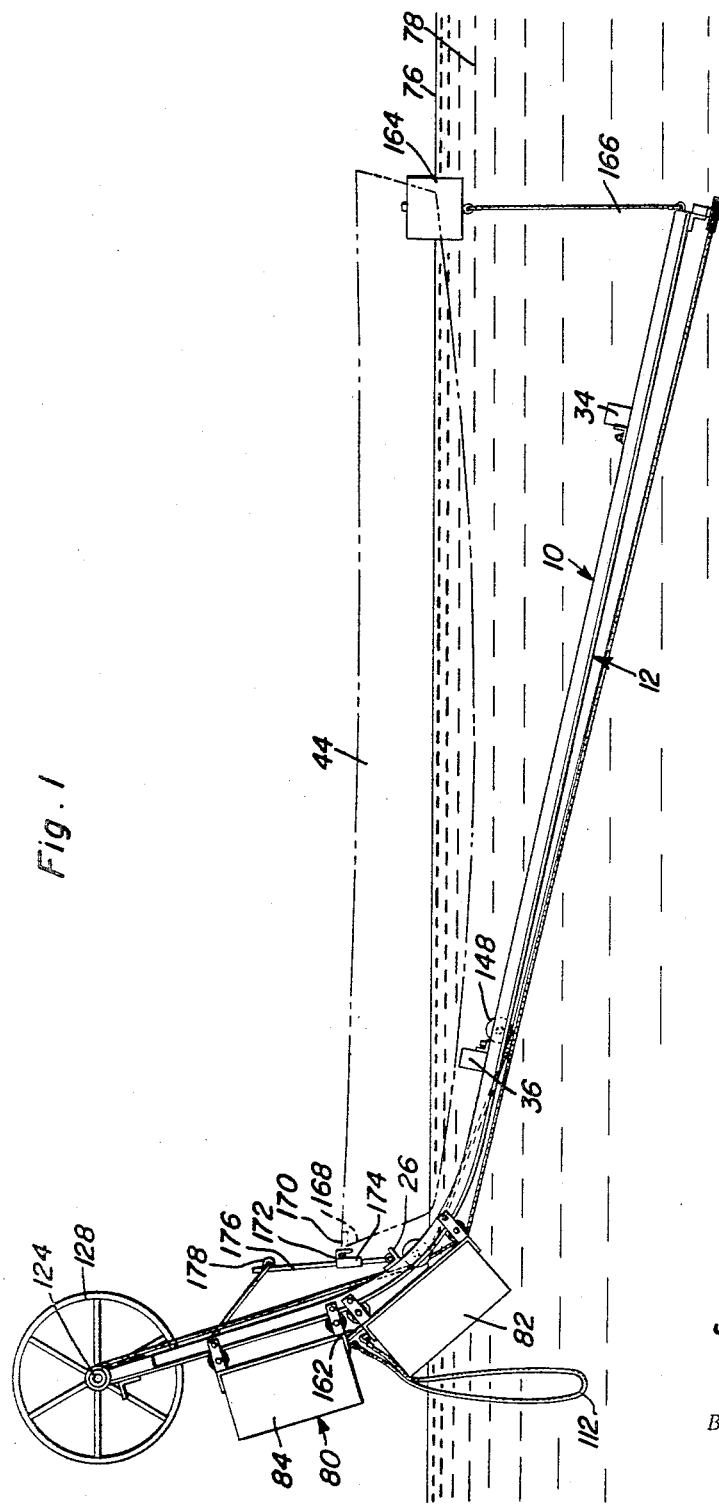
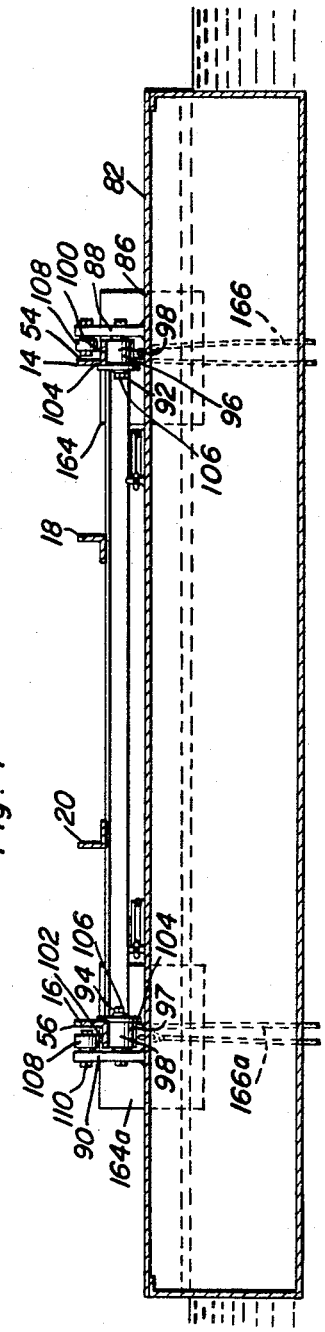
James H. Burkhart
INVENTOR.
BY Clarence A. O'Brien
and Harvey B. Jackson
Attorneys

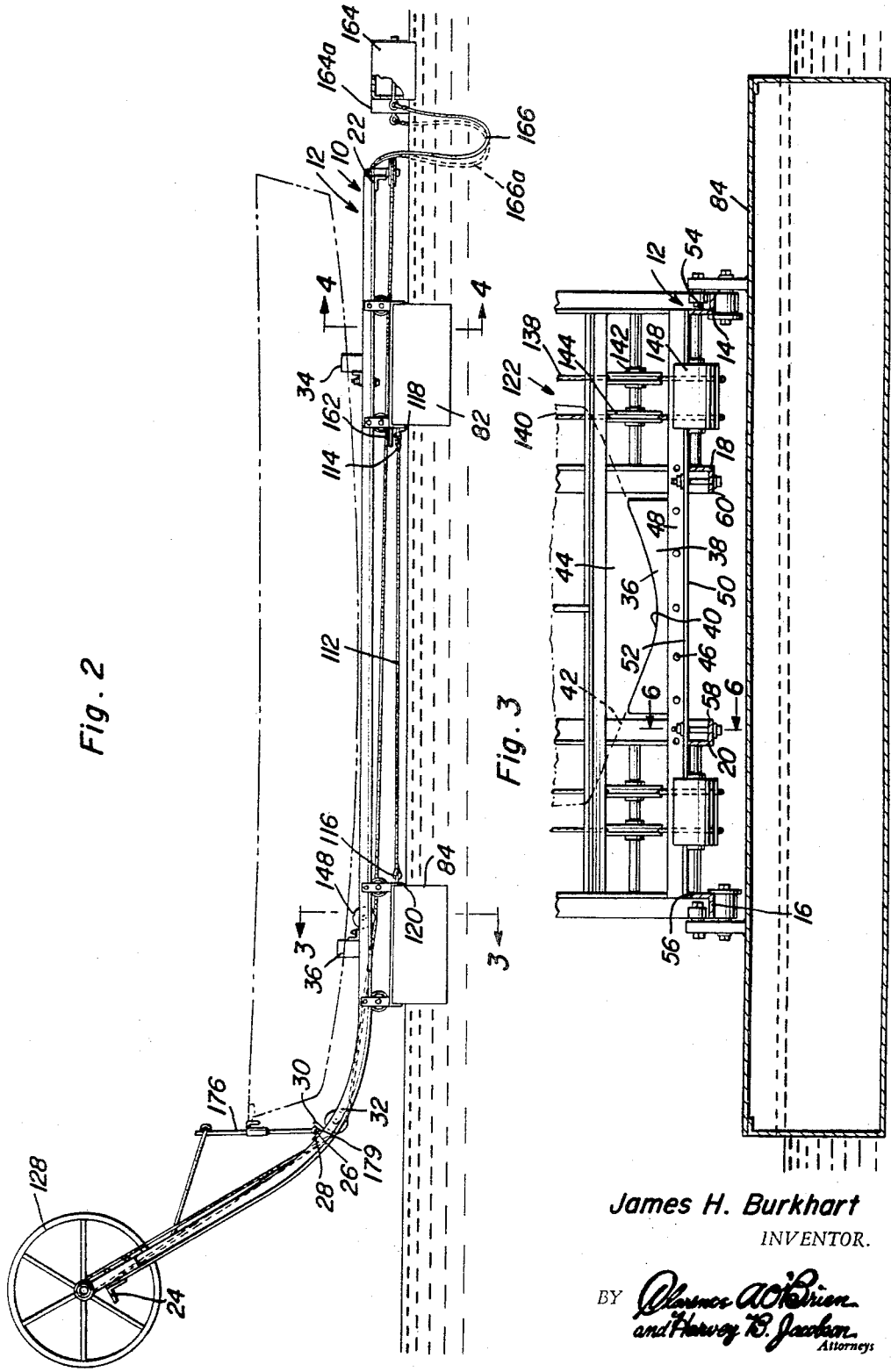

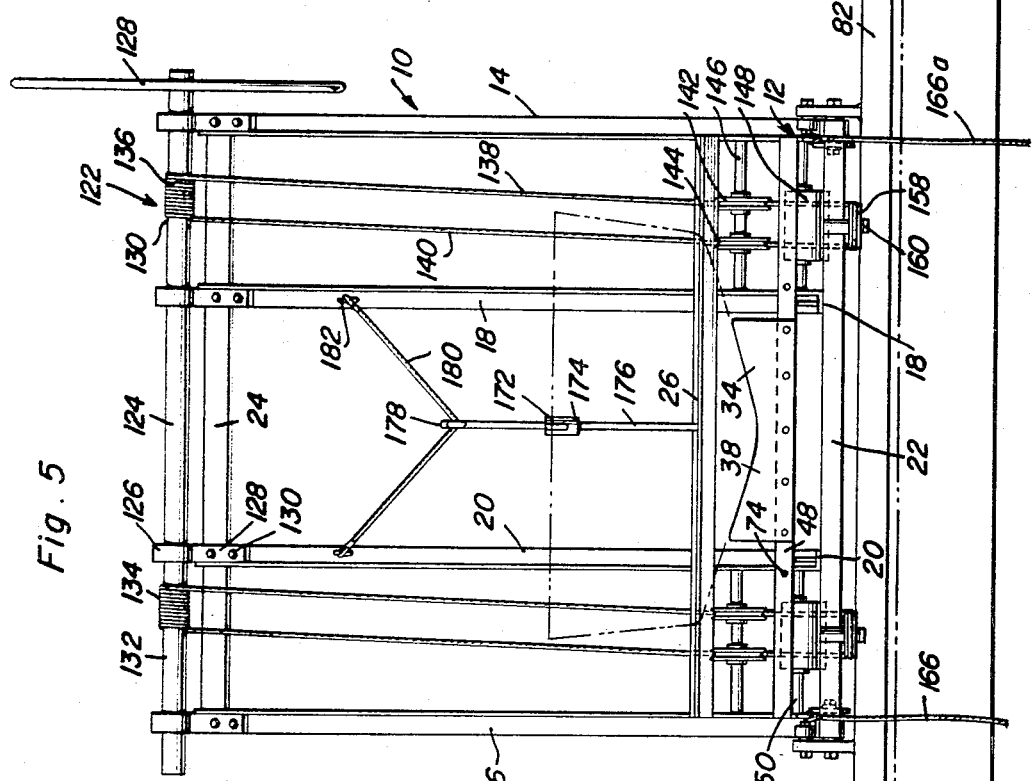
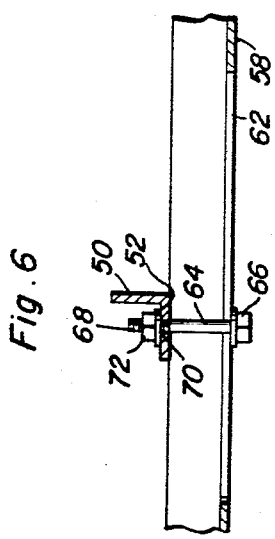
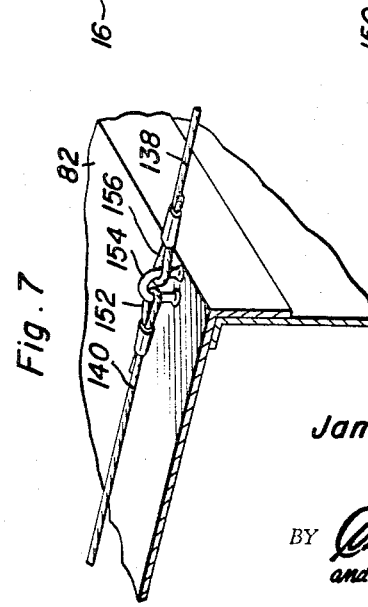
James H. Burkhart
INVENTOR.

United States Patent Office 3,406,649
Patented Oct. 22, 1968

3,406,649
METHOD AND APPARATUS FOR DRYDOCKING A BOAT HULL OR OTHER FLOATING STRUCTURE IN A BODY OF WATER
James H. Burkhart, 1001 S. Lewis Ave., Pryor, Okla. 74361
Filed Nov. 25, 1966, Ser. No. 597,105
15 Claims. (Cl. 114—45)

ABSTRACT OF THE DISCLOSURE

A floating drydock construction having an elongated frame formed by spaced parallel frame bars secured together and having adjustable hull-supporting chocks, two buoyant tanks slidable longitudinally along the underside of the frame, a winch mechanism on one end of the frame connected to the tanks by flexible cables, and two floats connected to the other end of the frame by short lines that limit the extent of submergence of that end when the tanks are adjacent the other end. When a boat hull is disposed over the drydock in the inclined floating position, the tanks are shifted longitudinally along the frame to spaced positions causing the frame to rise to a horizontal position and lift the hull out of the water.

---

This invention generally appertains to improvements in floating drydocks and more particularly relates to a novel means for drydocking a boat hull or other floating structure in a body of water.

The primary object of the present invention is to provide an extremely simple means of drydocking a boat hull or other floating structure in a body of water without requiring conventional external systems, such as overhead hoists or cranes.

In recent years, only a small percentage of boat and ship hulls have been constructed from wood, with the vast majority of boat hulls and similar floating structures being constructed out of metal, fiber glass and other materials which do not require moisture to keep the seams watertight so that the need of retaining a boat hull in the water is no longer necessary for the majority of hulls. Further, when the boat hulls are moored in the water, whether fresh or salt water, marine, vegetable and animal growth becomes attached to the hulls, slowing down the crafts due to excessive drag and requiring expensive cleaning and refinishing at frequent intervals for removing such growth from the hulls. Since the majority of boat hulls exist in connection with pleasure craft, which are in use only a small part of the time, it can be appreciated that the boat hull is moored in the water for the majority of the time and the accumulation of growth on the hull occurs mainly during the time it is moored and not in use.

Instead of mooring the boat hull in the water, which necessitates frequent and expensive cleaning and refinishing thereof to remove attached growth, various boat lift arrangements have been provided, in the nature of floating drydocks, which raise in slings or other devices or by means of overhead cranes or hoists and cable means the boat hull entirely out of the water.

However, such means are extremely complicated and cumbersome and are expensive to purchase and maintain and time consuming in operation.

An important object of the present invention is to obviate the disadvantages, attendant with conventional methods and means for mooring a boat hull by providing a relatively simple method and means for raising a boat hull out of contact with a body of water.

Another important object of the present invention is to provide novel means for easily and quickly mooring a boat and raising it out of the water without requiring a dock structure, support legs to the bottom, overhead cables and slings or the like, thereby rendering it possible to moor the boat in any anchoring depth of water or distance from shore and in the absence of any overhead structure and in a slip or mooring.

A still further important object of the present invention is to provide novel means of drydocking a boat hull or other floating structure in a body of water by the simple expedient of positioning supporting members under the boat hull and moving buoyant floats into positions under the hull in relation with the supporting members to raise the supporting members in the body of water and dispose the boat hull above and out of contact with the surface level of the body of water.

A further important object of the present invention is to provide novel means utilizing movable buoyant floats and so constructing and structurally relating the floats to allow the floats to move under a boat hull in a manner that does not of necessity require extra width over the hull beam yet maintained in a minimum storage space in the fore-and-aft direction of the boat and with the buoyant floats arranged to move under a boat hull or other floating body to raise it from the water on chocks or supporting members and to lower the boat hull or other floating body by moving the floats out from under the boat hull thus allowing the chocks or supporting members to submerge and the boat to be launched or free to float in the body of water.

A meritorious feature of the construction of the present invention resides in the provision of supporting members or chocks which are adjusted to fit the boat hull bottom with adequate support and are structurally interrelated in the fore-and-aft direction of the boat hull and are submerged enough to allow entry of the boat hull without interference or drag and to provide in relation with the supporting members buoyant float means, primarily in the nature of individual buoyant floats, and means for positively moving the buoyant float means into and out of position under the boat hull with each of the buoyant floats underlying the boat hull subjacent the chocks so as to raise the boat hull entirely out of the body of water and dispose the hull entirely and completely above and out of contact with the surface level of the body of water.

A further meritorious feature of the present invention resides in the provision of a frame structure positioned in a body of water and adapted to be arranged longitudinal or parallel to the axis of the boat and having an end supporting a winch and cable means for moving the buoyant floats into and out of positions immediately subjacent hull supports or chocks which are adjustably mounted on the frame structure and positioned transversely thereof, with the decided advantages stemming from such structural arrangement that there is ease of entry of the boat into position over the chocks and ease of quickly and easily mooring a boat and raising it out of the water.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 1 is a side elevational view of a floating drydock, constructed in accordance with the present invention, and showing the same in an inoperative lowered position, with the boat hull shown in dotted lines;

FIGURE 2 is a side elevational view, similar to FIGURE 1, but showing the drydock structure in operative disposition for supporting the boat hull, which is shown in dotted lines, above the water level and completely out of contact with the body of water;

FIGURE 3 is a detailed, vertical cross-sectional view, taken substantially on line 3—3 of FIGURE 2;

FIGURE 4 is a detailed, vertical cross-sectional view, taken substantially on line 4—4 of FIGURE 2;

FIGURE 5 is an end elevational view;

FIGURE 6 is a fragmentary detailed, vertical longitudinal sectional view, illustrating one means of longitudinal adjustment of the supporting structures or chocks relative to the frame structure; and FIGURE 7 is a detailed, fragmentary perspective view, showing the anchoring arrangement for the ends of a cable means, which serves, under the actuation of a winch means, to move the buoyant floats on the frame structure or in relationship therewith from and into operative and inoperative positions.

Referring now more particularly to the accompanying drawings, the floating drydock, generally designated by the reference numeral 10 includes a frame structure 12. The frame structure, as shown, is composed of a pair of parallel, longitudinally extending and transversely spaced side frame bars 14 and 16, which are of right angular cross-sectional configuration and are disposed in coplanar relationship and in an outwardly facing orientation. The frame structure 12 further includes an inner or center pair of frame bars 18 and 20, which are disposed in parallel, laterally spaced relationship and which are orientated in facing disposition, as shown in FIGURES 4 and 5. The frame bars are joined at their outer coextensive ends by a transverse angle iron 22, as shown more particularly in FIGURES 2 and 5.

The opposite ends of the outer frame bars 14 and 16 and the inner frame bars 18 and 20 are upwardly curved and are connected, adjacent their upper ends by a transversely disposed brace bar 24, which is of right angular cross-sectional configuration, as shown in FIGURE 2. Below the upper transverse end bar 24, the longitudinally extending and parallel frame bars of the frame structure 12 are connected by an angle iron 26, with the angle iron 26 having its flange 28 suitably fixed to the upper faces, in crosswise relationship, of the frame bars and having its flange 30 upstanding angularly from the upper faces of the frame bars, the angle iron 26 being disposed just above the arcuate bend 32 commonly formed in the frame bars, as shown in FIGURE 2.

Supporting members or means in structural association with the longitudinally disposed frame structure 12 is provided and, as exemplarily shown, is in the nature of outer and inner or fore-and-aft supporting chocks 34 and 36. The supporting chocks 34 and 36, as shown more clearly in FIGURES 3 and 5 with respect to the supporting chock 36 (it being understood that the chocks are similar in construction and in mode of attachment to the frame structure 12) includes a rigid, one-piece block 38, having an upper arcuate edge portion 40, which is adapted to complement and to seat, in transverse relationship therewith, the underside 42 of the boat hull 44. The chocks 34 and 36 are secured by fastening means 46, which may be in the nature of adjustable and removable bolt assemblies, to the vertical flange 48 of an angle iron 50. The angle iron 50 extends transversely of the frame structure with an angle iron being provided for mounting each of the chocks 34 and 36, as shown in FIGURE 2, for example. The angle iron 50 is formed with a horizontal flange 52 and the angle iron extends from the vertical flanges 54 and 56 of the outer frame bars 14 and 16 across the inner frame bars 18 and 20. The horizontal flanges 52 of the chock supporting angle irons 50 are adapted to rest on the upper edges of the vertical flanges of the angle irons 18 and 20 while being attached to the horizontal inturned and inwardly facing flanges 58 and 60 thereof by a longitudinally adjustable attachment means, as shown in FIGURE 3 and more clearly in FIGURE 6. In this respect, the horizontal flanges are formed with axial slots 62, as in the instance of the flange 58 in FIGURE 6, for the reception of the shank 64 of a bolt 66, with the head of the bolt underlying the slots and the threaded upper end portions 68 of the bolts passing through suitable apertures 70 in the horizontal flanges 52 of the supporting angle irons for the chocks and being fixed thereto by a nut 72.

Thus, by virtue of the clamping means, aforedescribed and shown in FIGURE 3 and in detail in FIGURE 6, the supporting angle irons for the outer and inner or fore-and-aft chocks 34 and 36 can be adjusted toward and away from each other or, otherwise stated, adjusted along the longitudinal extent or lengthwise axis of the frame structure for the purpose of accommodating boat hulls of varying lengths.

In the latter respect, the vertical flanges 48 of the supporting angle irons 50 are provided with a plurality of apertures 74 so that chocks of varying lengths can be attached to the supporting angle irons 48. Thus, the chocks are mounted with a consideration of the transverse span of the boat hull as well as the length or fore-and-aft dimension of a particular boat hull. Consequently, it can be seen that the chocks 34 and 36 can be provided and/or adjusted to cradle the hull bottom with firm support and, as shown in FIGURE 1 and as will be more specifically described, the chocks are submerged below the level or surface 76 of a body of water 78 to allow entry of the boat hull 44 in a direction lengthwise of the longitudinal frame structure 12, in the latter's submerged position, as shown in FIGURE 1, without any interference or drag.

The chocks 34 and 36 constitute a means on the frame structure 12 for cradling the hull 44 of a boat or other floating structure and buoyant float means 80 is provided and is movable into positions under the hull and in subjacent relation with the chocks, as shown in FIGURE 2, to raise the frame structure and the chocks in the body of water 78 and dispose the boat hull 44 above and out of contact with the surface level 76 of the body of water 78. As herein disclosed, the buoyant float means comprises a pair of identically constructed and dimensioned buoyant floats 82 and 84, which are in the nature of hollow, air and watertight buoyant tanks of a rectangular dimension and having end portions which extend beyond the opposing sides of the frame structure 12 in their raised inoperative positions or their lowered operative positions, as can be realized from a consideration of FIGURES 1 and 3. While the buoyant floats 82 and 84 have been shown as being composed of hollow, air and watertight buoyant tanks, it is to be understood that the floats could be formed from a solid section of plastic or other and similar material and that the illustration of the floats 82 and 84 is merely by way of example.

Each of the floats 82 and 84 is adapted to be interrelated so that the outer buoyant tank 82 underlies the outer chock 34 in an immediate subjacent relationship therewith while the inner buoyant tank 84 underlies the inner chock 36 in an immediate subjacent relationship thereto, when the buoyant tanks are in their operative relationship with each other and with the frame structure and chocks, as shown in FIGURE 2.

The buoyant tanks 82 and 84 are provided with means whereby they are in a structurally established guided relationship with the frame structure so that the tanks are movable from an inoperative position, as shown in FIGURE 1, into the operative position of FIGURE 2. As shown in FIGURES 3 and 4, each of the tanks 82 and 84 is provided with a top wall 86 and arms 88 and 90 upstand from the top walls and are perpendicular thereto, the arms being disposed in transversely spaced and aligned relationship on the top walls of the tanks. The arms 88 and 90 are provided, adjacent their lower end portions, with inwardly facing stub axles 92 and 94 on which flanged rollers 96 and 97 are rotatably disposed. The cylindrical body portions 98 of the rollers are adapted to engage and roll on the underface of the horizontal flanges 100 and 102 of the angle irons, while the flanges 104 on the outer ends of the body portions 98 are adapted to engage the inner faces of the vertical flanges 54 and 56. The flanged rollers 96 and 97 are held in place by locknuts 106 fixed on the protruding inner ends of the axles 92 and 94.

The rollers 96 and 97 are operable to engage and push upwardly on and therefore transfer the buoyant force of the tanks 82 and 84 to the underside of the horizontal flanges 100 and 102 of the outer frame bars 14 and 16 of the frame structure 12. Cooperating with such rollers are smaller rollers 108, which are corried by stub axles 110 extending inwardly from the upper end portions of the arms and the rollers are of a diameter so that they are spaced slightly out of engagement with the upper faces of the horizontal flanges 100 and 102 of the outer frame bars 14 and 16, and during the normal outward and inward travel of the tanks will come into engagement with the upper faces of the horizontal flanges, as the tanks are moved to their raised or inoperative positions, as shown in FIGURE 1, about the arcuate bent portions 32 of the frame bars.

The buoyant tanks 82 and 84, which are slidably mounted on the frame structure, as aforedescribed and as shown in FIGURES 3 and 4, are separate from each other but are connected by a flexible connection or tethering line or cable 112, the line or cable 112 having opposing loop ends 114 and 116 which are in hooked relationship with projecting hooks or loops 118 and 120, the former being provided on the rear face of the buoyant tank 82 and the latter being provided on the front face of the buoyant tank 84 whereby the tethering line 112 is interconnected between the confronting faces of the buoyant tanks 82 and 84 and is provided so as to locate the tanks relative to each other and, in so doing, interconnect the tanks for related movement and insure the disposition of the tanks in the desired subjacent relationship with the associated chock, as shown in FIGURE 2.

Winch and cable means 122 is provided for positively moving the buoyant floats 82 and 84 into and out of operative relationship with the frame structure. Such means 122 includes a shaft 124 which is rotatably mounted in bearings 126 provided on the outer ends of straps 128, which are secured by fastening means 130 to the upper ends of the frame bars 14, 16, 18 and 20, above the crossbar 24. The shaft 124 is rotatably disposed within the bearing arrangements 126 and may be rotated by any suitable power driven means or simply by an attached handwheel 128, which is secured to one of the projecting end portions of the shaft for manually rotating the shaft, as shown in FIGURE 5.

The shaft 124 constitutes, intermediate its end portions and between the adjoining outer and inner frame bars and associated bearing assemblies, two individual winch or drum means 130 and 132, on which flexible cables 134 and 136 are coiled. The cables 134 and 136 function in consort under the rotative impulse of the shaft 124 and each of the cables has reaches 138 and 140, which pass downwardly and under sheaves 142 and 144 which are rotatably mounted on a cross-shaft 146 between the adjoining outer frame bar and inner frame bar, as in the instance of the frame bars 14 and 18, as shown in FIGURE 5. It is to be understood that the assemblies, respecting the winch means and the cables and the reaches of the cables and the guide sheaves 142 and 144 for both the reaches are the same. The reaches 138 and 140 pass under guide drums 148, as shown in FIGURES 2, 3 and 5. The guide drums are rotatably disposed on fixed shafts 150 which are transversely fixed between the vertical flanges of the adjoining outer frame bars and inner frame bars. The drums 148, as shown in FIGURES 1 and 2, are disposed adjacent the chock 36 and the drums 148, as shown in FIGURES 3 and 5, are disposed in axial alignment and coplanar relationship and are of a length to receive in a divided and separate manner the reaches from the sheaves 142 and 144 and maintain them in separate oriented relationship. The drums are rotatable about aligned horizontal axes and the rotatable axes of the drums are parallel with the aligned rotatable axes of the sheaves 142 and 144 for the reaches of each of the cables 134 and 136. The reach 140 terminates in a free loop end 152, as shown more clearly in FIGURE 7, which is attached to one leg of a U-shaped hook 154 that upstands from the top wall of the outer or fore buoyant float 82. The reach 138 terminates in a free loop end 156 which is attached to the other leg portion of the hook 154 with the reach 138 passing around a horizontally disposed sheave or pulley 158 that is rotatably mounted on a vertical axle 160 affixed to the outer crossbar 22.

It can be seen that the reaches 140 are the drawing in reaches while the reaches 138 are the moving out reaches in the forced outward and inward movement of the buoyant floats 82 and 84 with respect to the inner and outer ends of the frame structure and the operative disposition of the floats in their subjacent relationship with the chocks 34 and 36.

The float 82 is provided at its rear wall with a spacer stop member 162, which serves the purpose, as shown in FIGURE 1, of preventing the float 82 from coming into contact with the float 84 when the floats are in their raised or inoperative positions.

As can be realized from a consideration of FIGURE 1, when the drydock 10 is not in use, the outer end of the frame structure is submerged within the water and is inclined at an angle to the inner end which is supported by the float 82. In order to prevent the outer end from becoming too submerged and to hold the weight and position the forward end, two free small floats 164 and 164a are provided and tethered by tethering lines 166 and 166a of a flexible nature, to the opposite ends of the outer crossbar 22 near the ends of the angle irons 14 and 16.

In FIGURE 1, the hull 44 of a boat is shown as it would appear in the body of water 78 with relation to the drydock 10. In this respect, the end 168 of the boat is provided with a projecting hook-like member 170, which is adapted to be engaged by the hook finger 172 of a slide member 174, the latter sliding freely on a rod 176. The rod 176 is rotatably mounted at its lower end portion 179 by any suitable pivot assembly carried by the angle iron 26 and is formed at its upper end with a hook 178 that is attached to the central portion of an elastic or resilient band 180, whish has its end portions attached to hooks 182 carried by the horizontal flanges of the inner frame bars 18 and 20 adjacent the inner or upper ends thereof.

Thus, the boat hull is moved into the position, as shown in FIGURE 1, and is fastened to the slide member 174 by the hook relationship. The opposing or outer end of the frame structure is positioned in depth in the body of water 78 by two small floats 164 and 164a attached to the ends of the frame bars 14 and 16 by flexible tethering lines 166 and 166a. The buoyant floats 82 and 84 are in the inoperative position, as shown in FIGURE 1 with the float 82 submerged slightly to hold the weight of the whole drydock assembly 10 on the associated end portion. The chocks 34 and 36 have been adjusted to fit the hull bottom 42 so as to support the hull bottom with adequate support and are submerged enough below the surface level 76 of the body 78 to allow entry of the boat hull longitudinally of the frame structure into the position, as shown in FIGURE 1, without interference or drag.

The shaft 124 is then rotated by the handwheel 128 or by any power means so as to allow the lowering reaches of the cables 134 and 136 to be free and the raising reaches to be taken up on the shaft 124. In other words, the lowering cable reach is slackened and the raising cable reach is tightened. The floats are thus moved to their operative positions, as shown in FIGURE 2, by the float 82 being directly pulled and it in turn through the interconnecting line 112 pulling the float 84 so that the floats are pulled under the chocks 34 and 36. As the floats 82 and 84 assume their operative positions under their associated chocks, the boat rises from the water and the boat hull is supported horizontally on the chocks, as shown in FIGURE 2, so that the bottom thereof is above and out of contact with the surface 76 of the body of water 78 with the floats 82 and 84 supporting the entire weight of the drydock assembly 10 and the boat.

In lowering the boat for floating positioning of the boat in the water, the cable lowering shaft 124 is rotated in the opposite direction allowing the cable reach 138 to slacken and the cable reach 140 to tighten. The cable reaches 140 pull on the float 82 and the float moves towards the float 84 and pushes, through the use of the spacer member 162, the float 84 ahead of it slackening the interconnecting tie or tethering cable 112. The supporting structure drops down in the water again, as shown in FIGURE 1, and the floats 164 and 164a again support the outer end of the frame structure at the proper depth.

While the frame structure, as shown in FIGURE 1, is inclined in its inoperative position, as it would probably be used more frequently than would the frame in a horizontal position with the chocks lowered below the surface level of the body of water 78, it should be noted that it could be lowered with the frame structure 12 horizontally disposed instead of in an inclined plane. By shortening the tethering cables 166 and 166a and raising the buoyant float 82 to more closely approach the cable winding shaft 124, the frame structure 12 could be held in a level or horizontal inoperative position.

In this respect, the frame structure on which the floats move and which supports the chocks could be made in a single U-shape with floats and winding shafts on each of the leg portions. As can be appreciated from FIGURES 1 and 2, the frame bars of the frame structure are longitudinal or parallel to the axis of the boat and curved upwardly at one of their ends to make a compact relatively minimum storage space above the water. The advantages of this arrangement over transverse moving floats is principally for ease of entry into the boat from either side.

An important advantage of this invention resides in the ease of quickly and easily mooring a boat and raising it out of the water. Once the boat is positioned, only the slide 174 needs to be fastened to the boat and then the boat is easily raised out of the water by rotating the handwheel 128 to lower the floats in the water. Also in launching a boat, it is only necessary to turn the handwheel to move the floats into the relationship, as shown in FIGURE 1, and release the slide member and the boat is free.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A drydock construction for raising a boat hull or other floating structure relative to the surface of a body of water upon which the hull or structure is floating, said construction comprising an elongated frame structure adapted to be parallel to a boat hull, load supporting means on said frame structure spaced longitudinally thereof for supporting the weight of the hull of a boat or other floating structure from said frame structure, buoyant float means, and means for selectively moving said buoyant float means longitudinally of said frame structure into and out of active position in supporting relation with said frame structure and in position relative to the latter to buoy up a load disposed on said load supporting means.

2. The invention of claim 1, wherein said buoyant float means in its active position is positioned subjacent the load supporting means and in its inactive position is positioned adjacent one end of said frame structure.

3. The invention of claim 1, wherein said buoyant float means includes a pair of float members, flexible means interconnecting said float members, and said means for moving said buoyant means includes a winch and cable means connected between the float members and one end of the frame structure with the float members movable along the longitudinal axis of the frame structure so as to be moved lengthwise of the frame structure.

4. The invention of claim 3, wherein the other end of the frame structure, when the moving means has moved the float members towards said one end and into an inoperative position is sufficiently weighted to cause the frame structure to be angularly displaced about a transverse axis so to dip said other end downwardly into a supporting body of water upon which said construction is floated.

5. The invention of claim 4 including additional float members tethered by flexible tethering lines to the other end of the frame structure at the outer sides thereof to limit its depth of dip into the body of water.

6. The invention of claim 3, wherein said frame structure and float members have interacting guide means for the guided movement of the float members on the frame structure from the one end into operative positions under the load supporting means and from operative positions under the load supporting means to inoperative positions at the one end of the frame structure.

7. The invention of claim 3, wherein said float members are raised at said one end to float said one end and additional float members are tethered by flexible tethering lines to the other end of the frame structure at the opposing sides thereof to support the weight of the other end with the frame structure being inclined and the load supporting means positioned below the level of the body of water to receive the boat hull.

8. The invention of claim 6, wherein said one end of the frame structure supports the winch means.

9. The invention of claim 6, wherein means is provided at said one end of the frame structure for anchoring a boat hull thereto and thereby to the frame structure.

10. The invention of claim 6, wherein said frame structure includes at least two longitudinal, parallel frame bar members, said load supporting means including hull supporting chocks transversely positioned between said frame members with a boat hull adapted to be disposed on the chocks and arranged longitudinally of the frame bar members.

11. The invention of claim 1, wherein said frame structure is elongated, said load supporting cradling means including portions spaced longitudinally of the frame structure, said buoyant float means including buoyant floats, guide means between said buoyant floats and the frame structure for the guided movements of the buoyant floats between inoperative positions at one end of the frame structure and operative positions under the frame structure spaced apart lengthwise of the frame structure, said moving means including a winch and cable means, said cable means being connected to one of the floats.

12. A drydock construction for raising a boat hull or other floating construction relative to the surface of a body of water upon which the hull or structure is floating, said construction comprising an elongated frame structure having buoyant means thereon for floating the frame structure in an inclined position with one end portion adjacent the surface of the water and the other end portion submerged, said buoyant means including at least one float movably mounted on said frame structure and disposed on said one end portion when the frame structure is in said inclined position, and selectively operable means for shifting said float back and forth longitudinally of said frame structure from said one end portion toward said other end portion to raise the latter beneath a hull or other structure into a generally horizontal position for lifting the hull or other structure out of the water.

13. A drydock construction as defined in claim 12 in which said buoyant means includes two such floats extending transversely of said frame structure and positioned on said one end portion when the frame structure is in said inclined position both of said floats being movable longitudinally of the frame structure toward said other end portion by said shifting means into longitudinally spaced positions for supporting the frame structure in said horizontal position.

14. A drydock construction as defined in claim 13 in which said shifting means includes at least one flexible cable connected to said floats and guided along said frame structure, and drive means accessible from said one end portion for pulling said cable toward said other end portion to pull both of said floats along the frame structure to said longitudinally spaced positions, said cable including an interconnecting line between said floats establishing the spaced relationship of said floats in said longitudinally spaced positions.

15. A drydock construction as defined in claim 13 in which said buoyant means includes, in addition to said movable floats on said one end portion when said frame structure is in said inclined position, at least one additional float secured to said other end portion by a line of preselected length limiting the extent of submergence of said other end portion and determining the incline of the frame structure.

References Cited

UNITED STATES PATENTS 87,291    2/1869    Richardson _____ 114—46

FOREIGN PATENTS 256,373    2/1913    Germany.

ANDREW H. FARRELL, *Primary Examiner.*